J. F. SCHUMAN.
NUT FASTENER.
APPLICATION FILED FEB. 25, 1919.

1,310,167.

Patented July 15, 1919.

Inventor
John F. Schuman
By Chas. J. Williamson,
Attorney

UNITED STATES PATENT OFFICE.

JOHN F. SCHUMAN, OF READING, PENNSYLVANIA.

NUT-FASTENER.

1,310,167. Specification of Letters Patent. Patented July 15, 1919.

Application filed February 25, 1919. Serial No. 279,049.

*To all whom it may concern:*

Be it known that I, JOHN F. SCHUMAN, of Reading, Pennsylvania, have invented a certain new and useful Improvement in Nut-Fasteners, and do hereby declare that the following is a full, clear, and exact description thereof.

My invention relates to devices for preventing the accidental separation of nuts and bolts, and my object is to provide such a device that will be of the highest efficiency, easy and quick of application and removal, when necessary, economical of metal, and easily made, and, therefore, inexpensive, and especially well adapted for railroad use; and to this end, my invention consists in the device having the construction substantially as hereinafter specified and claimed.

In the annexed drawings.

Figure 1:
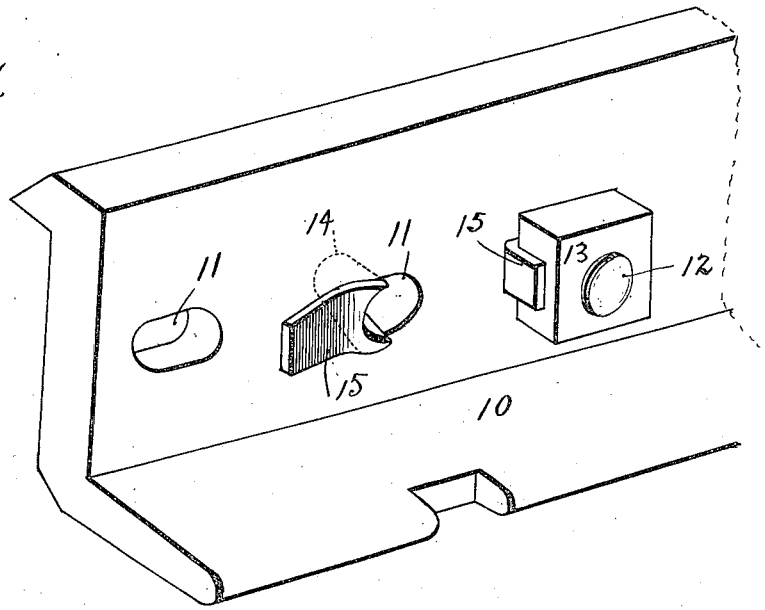
Figure 1 is a perspective view of a portion of a fish plate illustrating the use of my invention.
Figure 2:
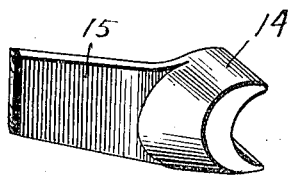
Fig. 2 is a like view of one of the fasteners, before its application.

Referring to the drawings, in detail, 10 designates a fish plate, of usual construction having all its bolt holes 11 horizontally elongated, 12 a bolt of ordinary construction, and 13 its nut, of usual construction. The bolt body, adjacent its head, as usual, is of a form to fit the elongated form of the fish plate opposite to the one against which the nut presses, and thereby the bolt is kept from turning, making it necessary, therefore, merely to provide means for holding the nut from turning on the bolt. It is an important feature of my invention as facilitating its adoption, to require no change from the ordinary construction of bolt, nut and fish plate, save in making all the holes of the fish plates elongated instead of alternately round and elongated, as is common.

Figure 3:
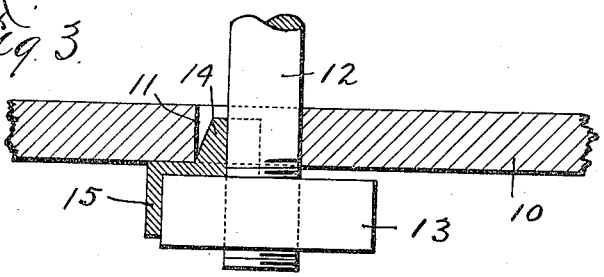
Fig. 3 is a detail view, in section, showing the assembled bolt, nut and fish plate, with the fastener applied.

My fastener comprises a block or head 14 of an external form and size to admit its insertion into a fish plate hole, alongside a bolt therein, and a tail or wing 15 which, when the head is thus inserted in the hole, will lie on the outside of the fish plate and be engaged by the nut when applied to the bolt, but not wholly covered thereby, so that the protruding end portion of the tail may be bent outward and against an adjacent flat side of the nut, as clearly shown in Fig. 3. Preferably, the side of the head against the bolt is half concave to fit and bear against the bolt side, and its outer surface is convex, but is inclined to provide a taper, the small end of the taper being inward, so that the insertion of the head in the fish plate hole is facilitated, but more important than that, by the inward pressure of the nut in being screwed on the bolt and against the head, the latter will be cammed, or crowded sidewise by the contact of the incline with the end wall of the hole, and thus caused to bear hard against the side of the bolt, assuring against looseness and rattling of the parts. As the hole elongation is of uniform or substantially uniform width throughout the thickness of the fish plate, a mere edge or corner is provided by its wall for the contact of the taper head therewith, and thus the camming action is facilitated. As the head need not go but half, or less than half way around the bolt, my device requires a minimum of material, it can be made to exert the camming action just described, and it can be easily applied to fish plate and bolt.

Preferably, to facilitate the bending of the wing or tail against the nut, it is made to stand obliquely, so that when the device is applied to the fish plate, a space will exist between the latter and said tail for the easy application of a tool to press the tail outward and against the nut.

When the nut is to be removed, it is necessary merely to pry the tail away from engagement with it.

The wing or tail affords a convenient handle for the device. It may be given any form that may be desired.

What I claim is:—

The combination of a bolt, a nut, a fish plate having a bolt hole that is elongated to provide a space at the side of the bolt of uniform or substantially uniform width throughout the thickness of the fish plate, and a nut fastener comprising a head in said space with a bolt-engaging side and an inclined side that engages the edge of the hole wall, whereby said head is crowded against the bolt.

In testimony that I claim the foregoing I have hereunto set my hand.

JOHN F. SCHUMAN.

Copies of this patent may be obtained for five cents each, by addressing the "Commissioner of Patents, Washington, D. C."